March 17, 1959   J. LATZEN   2,878,046

BALL AND SOCKET JOINTS AND METHOD OF MAKING SAME

Filed April 5, 1955

INVENTOR
Josef Latzen

BY *Diggins & LeBlanc*
ATTORNEYS

United States Patent Office 2,878,046
Patented Mar. 17, 1959

2,878,046

BALL AND SOCKET JOINTS AND METHOD OF MAKING SAME

Josef Latzen, Dusseldorf-Oberkassel, Germany

Application April 5, 1955, Serial No. 499,430

Claims priority, application Germany April 10, 1954

6 Claims. (Cl. 287—87)

The invention relates to a method of making ball and socket joints, for example for steering and control linkages, especially of motor vehicles, of the kind in which the ball rests in an elastic lining in a concave spherical seating provided in the portion of the socket through which the ball pin projects. The invention provides a ball and socket joint and a method by which the joint can be made simply and cheaply without having to adhere to accurate fits.

According to the invention, a method of making a ball and socket joint of the above kind comprises forming the elastic lining to shape by pressing a flat sheet of elastic material between the ball and the seating. The flat sheet preferably has a central hole and is placed over the ball pin adjacent the ball and is then inserted together with the ball into the socket through an opening in the portion of the socket opposite the seating. In this way, the elastic lining for the ball seat is formed automatically out of a flat sheet, without any necessity for very accurate machining or shaping of the concave spherical surface in the socket accommodating the elastic lining or for very accurate dimensioning of the thickness and size of the elastic sheet, since any inaccuracies there may be are automatically compensated by means of the elasticity of the sheet.

The central hole in the elastic sheet advantageously has a smaller diameter than the part of the ball pin bearing against the edges of said hole. This offers the advantage that when the ball pin is passed through the central hole in the sheet, a lip bearing against the neck of the ball pin is produced. This acts as a seal against the penetration of dust and other fine dirt particles to the ball.

Preferably the sheet has an equilateral polygonal, and preferably hexagonal, outline for forming the elastic lining. Such sheets can be punched out without any waste, so that further reduction in the cost of the ball and socket joint is achieved.

It is therefore one object of the present invention to provide an improved ball and socket joint.

Another object of the present invention is to provide an improved method of making a ball and socket joint.

Figure 1:
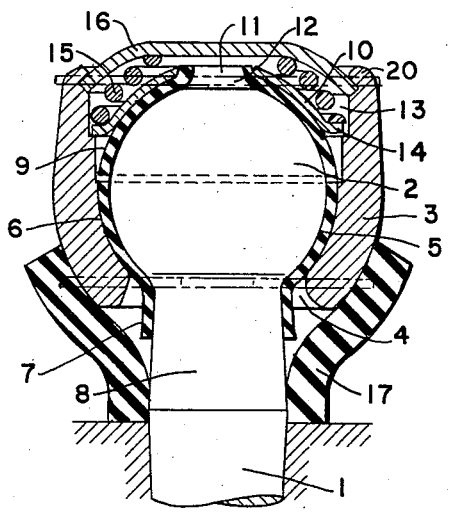

These and further objects and advantages of the invention will be more apparent upon reference to the following specification, claims and appended drawings wherein:

Figure 1 shows a vertical section through a ball and socket joint.

Figure 3:
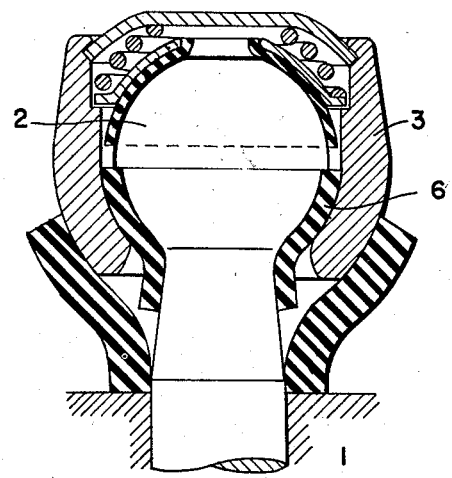
Figure 2:
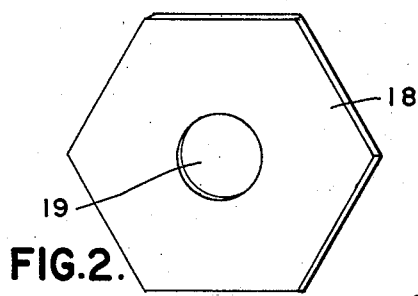
Figure 4:
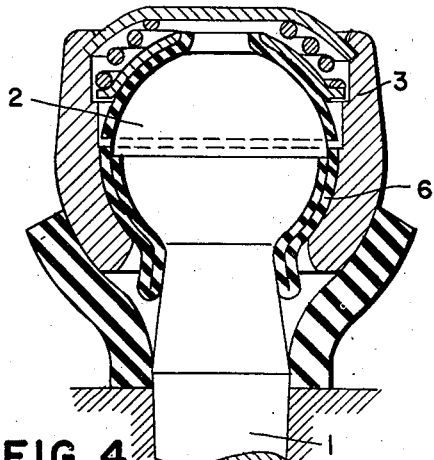
Figure 5:
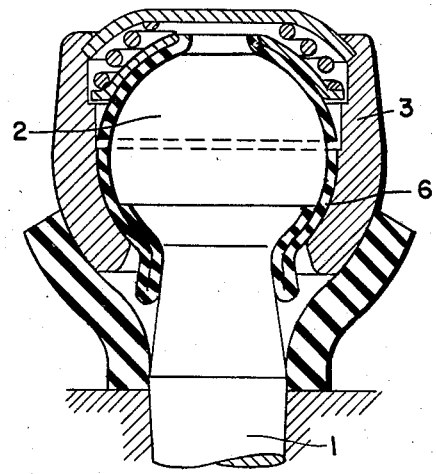

Figure 2 is a plan view of a flat elastic sheet from which part of the lining of the joint is formed, Figure 3 shows a vertical section through another ball and socket joint, Figure 4 shows a vertical section through a ball and socket joint in which part of the lining is formed with two layers of elastic sheet, and Figure 5 shows a vertical section through a ball and socket joint similar to that shown in Figure 4 with the inside layer of elastic sheet terminating short of the horizontal center of plane of the joint.

Referring to the drawing, and more specifically to Figures 1 and 2 ball and socket joint comprises a ball pin 1 with a ball 2 and a socket 3. A concave spherical seating is provided in the joint socket on the side adjacent an aperture 4 through which the ball pin 1 projects. Between the spherical seating and the ball there is a sheet of elastic material 6 which bears against a neck 8 of the ball pin 1 after the fashion of a lip 7. The sheet 6 is initially flat and shaped as a hexagon 18 with a central hole 19.

On the side adjacent a closure member 16, the ball bear bears against an elastic sheet 9, which is covered by a sheet metal plate 10 having a curvature corresponding to the curvature of the ball. The sheet metal plate 10 and the elastic sheet 9 have central holes 11 and 12, respectively. An opening 13 in the socket accommodating the plate 10 is formed with a shoulder. The plate 10 has a flat peripheral flange 14 and has a clearance in the opening 13. The flange 14 is engaged by a spring 15, which abuts against the closure member 16. The diameter of the turns of the spring decreases from the flange 14 of the sheet metal plate 10 towards the closure member 16.

On the side of the socket adjacent the ball pin there is provided a packing sleeve 17, which bears against the outside of the socket and against the ball pin. The packing sleeve may be made of any suitable elastic material. The joint is assembled in the following manner: The flat hexagonal elastic sheet 18 is placed over the joint pin which extends through the hole 19. The diameter of the hole 19 in the sheet is smaller than the diameter of the ball pin and of the neck 8, so that when the flat sheet 18 is placed over the pin the lip 7 is formed at the ball neck. The ball pin is then passed through the opening 13, the ball and the flat sheet 18 being fitted into the concave spherical seating 5 in the socket 3. The flat sheet 18 is pressed into the shape of the bearing lining 6 shown in Figure 1. After this, the sheet 9 which like the sheet 18, is initially flat is inserted into the socket through the opening 13 and is pressed against the ball 2 by means of the sheet metal plate 10, the sheet 9 adopting the shape which can be seen in Figure 1. The introduction of the sheet 9 into the socket can be effected by forcing the sheet into the socket by means of the plate 10. The spring 15 is engaged with the flange 14 of the sheet metal plate 10 and the housing is thereafter closed, the spring 15 being compressed by means of the closure member 16. The closure member 16 is fixed in position by means of a rim 20 provided on the socket.

In Figure 1, the original flat form of the sheets 18 and 9 is shown in broken lines.

The elastic sheet 18 and the elastic sheet 9 consist of synthetic resin of the group of polyaddition products having a cross-linked structure for example, polyurethane.

In Figure 3, the ball is recessed or reduced in diameter adjacent the ball pin. The sheet 6 has a greater thickness corresponding to the reduction.

It is also possible to make the part of the ball adjacent the pin so that it is more or less cone-shaped. Of course, in such a case the joint is only suitable for small angular deflections.

In addition, it is possible for two or more sheets 6 to be provided such as can be seen, for example, in Figures 4 and 5, in the case of a ball in which the part of the ball adjacent the ball pin is of a small diameter. The reduction in radius or setting back corresponds in this instance to the thickness of one elastic sheet. In Figure 4, the recessed or reduced portion and the second lining layer extend about to a plane taken through the center of the ball transversely of the axis of the pin, while in Figure 5 the reduction is effected only in the region of the ball pin. While in Figures 4 and 5 the second elastic layer is formed by an inwardly turned over portion of the sheet forming the lining it is also possible for two separate sheets to be provided. The sheets may also be of different thickness.

The elastic sheets employed for forming the lining can consist of any suitable elastic material for example a synthetic resin or rubber of natural or synthetic origin. It is particularly advantageous, however, if at least one of the elastic sheets, preferably, however, both consist of a synthetic resin of the group of polyaddition products having a cross linked structure, such as polyurethane (for example Vulkollane made by Farben-Fabriken Bayer) the elasticity of which is suitably adjusted. These synthetic resins have good sliding qualities, resistance to abrasion, and resistance to ageing and also the property of swallowing up foreign bodies. Moreover, these synthetic resins can be pressed particularly favorably into the cup-shape required for forming the lining in the manner according to the invention.

An advantage of the invention is also that the elastic sheets forming the lining can readily be replaced.

The invention is not limited to the kind of joint shown in the drawings but can also be employed, with the necessary modifications, for ball and socket joints of other design. Thus, for example, in a ball and socket joint having an enclosed socket and into which the ball is introduced through the aperture through which the ball pin projects and in which the seating for the ball is provided on the side of the socket opposite the ball pin. The ball can be pushed into the socket with an elastic sheet arranged on top of the ball, while a closure collar for the socket is slipped over the ball pin, and having a concave surface for forming a further ball seating causes the second elastic sheet placed over the ball pin to bear against the ball.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of claims are therefore intended to be embraced therein.

I claim:
1. A method of making a ball and socket joint comprising passing the pin of a ball through a central hole in an initially flat first sheet of elastic material wherein the central hole has an initial diameter smaller than the diameter of the ball pin, moving said first sheet of elastic material along said ball pin so that a portion of said first elastic sheet snugly surrounds a portion of said ball pin and another portion of said first elastic sheet surrounds a portion of the spherical ball, inserting said ball with said ball pin foremost through an opening in a socket opposite the seating surface of said socket to position said first sheet of elastic material against said seating surface but slidable with respect thereto, placing an initially flat second sheet of elastic material over the end of said ball opposite said ball pin, pressing a cup-shaped movable rigid element with a spring against said second sheet of elastic material within said opening in said socket, and closing said opening with a closure member.

2. A method of making a ball and socket joint comprising passing the pin of a ball through a central hole in an initially flat first sheet of elastic material wherein the central hole has an initial diameter smaller than the diameter of the ball pin, moving said first sheet of elastic material along said ball pin so that a portion of said first elastic sheet snugly surrounds a portion of said ball pin and another portion of said first elastic sheet snugly surrounds a portion of the spherical ball having a reduced diameter, inserting said ball with said ball pin foremost through an opening in a socket opposite the seating surface of said socket to position said first sheet of elastic material against said seating surface but slidable with respect thereto, placing an initially flat second sheet of elastic material over the end of said ball opposite said ball pin and having a greater diameter than said reduced portion, pressing a movable cup-shaped rigid element against said second sheet of elastic material with a spring positioned within said opening in said socket, and closing said opening with a closure member.

3. A ball and socket joint comprising a socket having an aperture at one end and an opening at the other end, a substantially spherical ball rotatably mounted in said socket and having a pin extending outwardly through said aperture, a first sheet of elastic material having a central aperture surrounding said ball pin and having a portion snugly engaging said pin and a portion between said socket and the portion of said ball adjacent said ball pin, said first sheet of material being slidable with respect to said socket, a second sheet of elastic material positioned against the end of said ball adjacent said opening, a movable cup-shaped rigid element pressing against a portion of said second sheet of elastic material, a closure member closing said opening in said socket, and a spring positioned between said closure member and said rigid cup-shaped element and pressing said rigid cup-shaped element to yieldingly press said second sheet of elastic material against said ball.

4. A ball and a socket joint comprising a socket having an aperture at one end and an opening at the other end, a ball rotatably mounted in said socket and having a pin extending outwardly through said aperture, said ball having a spherical portion of reduced diameter adjacent said pin and a spherical portion of enlarged diameter opposite said pin, a first sheet of elastic material having a central aperture surrounding said ball pin and having a portion snugly engaging said pin and a portion between said socket and the spherical portion of said ball of reduced diameter, said first sheet of material being slidable with respect to said socket, a second sheet of elastic material positioned against the portion of said ball of enlarged diameter, a movable cup-shaped rigid element pressing against a portion of said second sheet of elastic material, a closure member closing said opening in said socket, and a spring positioned between said closure member and said rigid cup-shaped element and pressing said rigid cup-shaped element to yieldingly press said second sheet of elastic material against said ball.

5. A ball and socket joint as defined in claim 4 wherein said first sheet of elastic material is doubled upon itself to form two layers with the outer layer extending over the portion of said ball of reduced diameter and partially over the portion of said ball of enlarged diameter.

6. A ball and socket joint as defined in claim 4 wherein both said first and second elastic sheets of material are formed of flexible polyurethane.

References Cited in the file of this patent
UNITED STATES PATENTS

| | | |
|---|---|---|
| 1,923,601 | Weaver | Aug. 22, 1933 |
| 2,181,300 | Flumerfelt | Nov. 28, 1939 |
| 2,246,086 | Austin | June 17, 1941 |
| 2,280,634 | Flumerfelt | Apr. 21, 1942 |
| 2,537,629 | Brown | Jan. 9, 1951 |
| 2,715,766 | Ricks | Aug. 23, 1955 |

FOREIGN PATENTS

| | | |
|---|---|---|
| 72,361 | Norway | July 21, 1947 |